Figure 1:
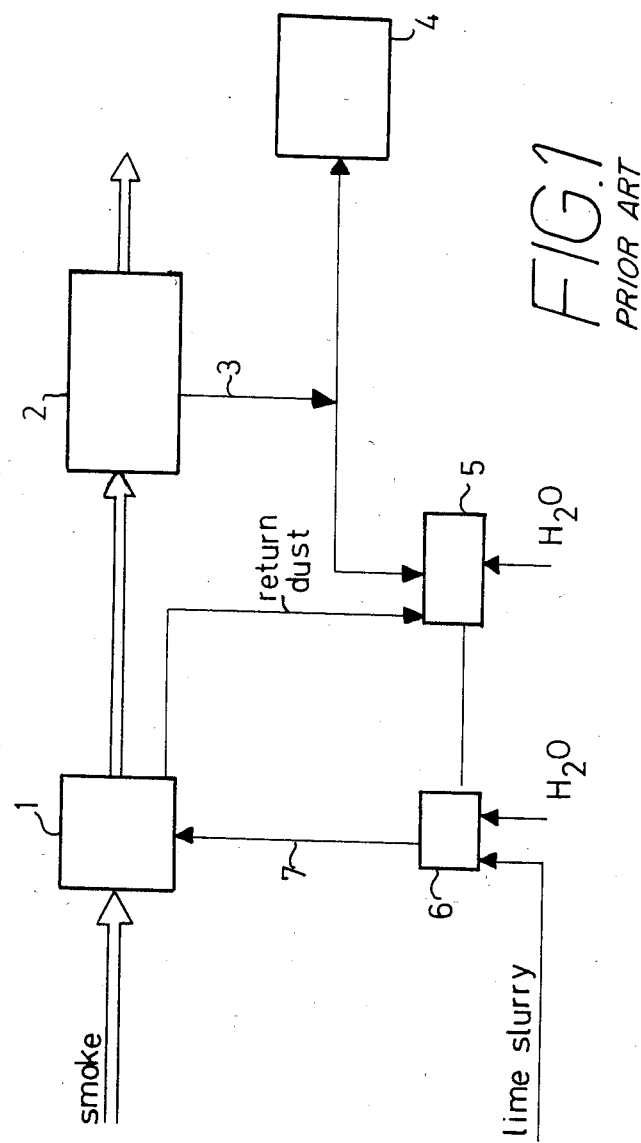

United States Patent [19]

Edwall et al.

[11] Patent Number: 4,590,046

[45] Date of Patent: May 20, 1986

[54] METHOD FOR THE PURIFICATION OF FLUE GASES

[75] Inventors: Bengt Edwall, Skurup; Hans Karlsson, Lund, both of Sweden

[73] Assignee: Sydkraft AB, Malmo, Sweden

[21] Appl. No.: 570,653

[22] Filed: Jan. 13, 1984

[30] Foreign Application Priority Data

Jun. 14, 1983 [SE] Sweden ................................ 8303381

[51] Int. Cl.$^4$ ............................................. C01B 17/00
[52] U.S. Cl. ..................................... 423/242; 423/555
[58] Field of Search ............... 423/242 A, 244 A, 555; 422/169, 170

[56] References Cited

U.S. PATENT DOCUMENTS

| | | | |
|---|---|---|---|
| 3,708,266 | 1/1973 | Gustausson | 423/242 |
| 4,061,716 | 12/1977 | McGauley | 423/242 A |
| 4,279,873 | 7/1981 | Felsvang et al. | 423/242 A |
| 4,328,195 | 5/1982 | Mori et al. | 423/242 A |
| 4,434,146 | 2/1984 | Weber | 423/573 R X |
| 4,472,364 | 9/1984 | Bauerle et al. | 423/242 |
| 4,487,784 | 12/1984 | Kuroda et al. | 423/555 |

*Primary Examiner*—Gregory A. Heller
*Attorney, Agent, or Firm*—Ziems, Walter & Shannon

[57] ABSTRACT

Procedure and plant for spray drying absorption of flue gases by separation of $SO_2$. A suspension of finely-ground limestone is added to a reactor via an oxidation and acidification unit, where the finely-ground limestone is mixed with recirculated solids and air, oxygen and/or some of the flue gases. Preferably, the recirculated solids is also subjected to reactivation by wet-grinding.

5 Claims, 2 Drawing Figures

METHOD FOR THE PURIFICATION OF FLUE GASES

The present invention relates to a method for desulphurization of flue gases by spray drying absorption using finely-ground limestone, and to a spray drying purification plant for realization of the method. The majority of the existing methods for desulphurization of flue gases make use of lime, i.e. $Ca(OH)_2$, as the reagent in the reaction with $SO_2$. The disadvantages of lime are that it is a relatively expensive product and that lime-based spray drying absorption primarily produces calcium sulphite, which is unfavorable from the points of view of recovery and disposal. Normally, approximately 10% sulphate is obtained, while the remainder is primarily sulphite. While calcium sulphate, i.e. gypsum, is a useable final product, calcium sulphite has to be oxidized into sulphate before it can be used.

The large quantity of sulphite is obtained because $Ca(OH)_2$ gives an alkaline reaction liquid which inhibits the oxidation of sulphite to sulphate.

It would be advantageous from a financial point of view to be able to use limestone —$CaCO_3$— instead of lime. Limestone is far less expensive than lime and also increases the possibility of obtaining gypsum as the final product. Limestone is generally considered too inactive for use in spray drying absorption of $SO_2$ bearing flue gases. However, a number of attempts have been made to increase the effectivity of limestone-based processes.

One existing method raises the moisture retention capacities of the dry reactor product, thus increasing the uptake of $SO_2$, through the addition of various salts.

In another method, substances are added to extend the drying time of the drops, thus also increasing the uptake of $SO_2$. In yet another method, a cobalt catalyst is added in order to favor the oxidation of sulphite to sulphate, thus increasing the uptake of $SO_2$. The major disadvantage of all the abovementioned limestone-based methods is that they make use of additives, and these additives must in turn be recovered. Furthermore, the final product, the gypsum, is polluted, which makes it virtually unusable without further purification.

Further negative effects are inter alia that the salts, which increase the moisture retention capacity of the product in the reactor, simultaneously reduce its oxidation capacity.

One of the objects of the present invention is to provide a method and a plant for desulphurization of flue gases by spray drying absorption in which limestone is used for the separation of $SO_2$ without reactivity-raising additives.

Another object of the present invention is to provide a method and a plant for desulphurization of flue gases by spray drying absorption in which the final product mainly consists of calcium sulphate; i.e. gypsum.

These objects are attained with the aid of a method for spray drying absorption of flue gases in which the $SO_2$ is first separated, in a reactor, from the flue gases which are being purified, and in which the solids are then separated in a solids precipitator or a filter, after which the solids are returned to the reactor, where finely-ground limestone is added in the form of a water suspension and air, oxygen and/or some of the smoke is mixed with the recirculated solids and the finely-ground limestone before the $SO_2$ separation, and a plant for the carrying out of the method of this invention which, in addition to the $SO_2$ separation unit, is comprised of a solids precipitator unit and a recirculation conduit, an oxidation and acidification phase and, possibly, a reactivation phase for wet-grinding of the recirculated solids.

The method and plant described in the present invention make it possible to use limestone, which is far less expensive than lime. Most importantly, a more effective desulphurization procedure is obtained with gypsum being the main final product, which is advantageous from both the financial and the recovery point of view.

One of the primary parameters for the achievement of satisfactory results is the quality of the grinding of the limestone.

According to the classical chemical reaction technique, the particle diameter is the decisive parameter for a reaction of the type intended here. Recent research, however, indicates that, instead, it is the specific surface, i.e., $m^2g^{-1}$, which is the decisive factor. High specific surface gives high reactivity and thus high separation of $SO_2$.

Figure 2:
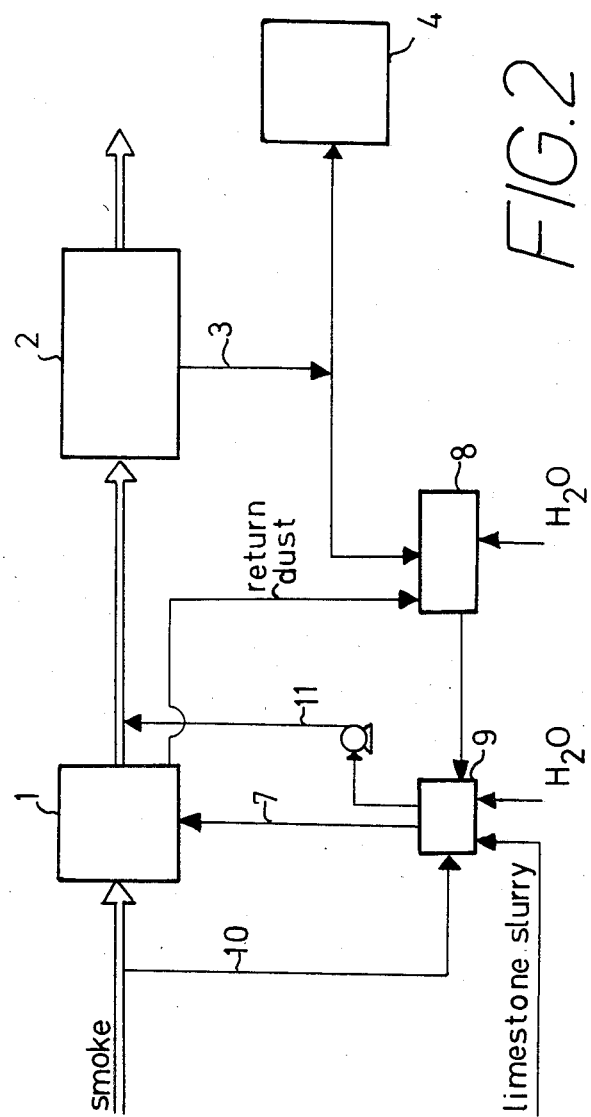

A more detailed description of the invention is given below, with reference to the drawings, where FIG. 1 is a schematic view of a conventional spray drying absorption process and FIG. 2 is a schematic view of a limestone-based spray drying absorption process of the present invention.

PRODUCTION OF THE ABSORBENT, I.E. THE FINELY-GROUND LIMESTONE SLURRY

Limestone is ground in order to obtain a specific surface of at least 5 $m^2g^{-1}$ and preferably over 12 $m^2g^{-1}$. There are several possible grinding procedures. Generally, the result obtained after grinding is dependent on the geographical and historical background of the limestone. Thus the optimal grinding procedure must be selected for each individual case. A great deal of energy is required for the grinding process, and therefore the grinding time should be as short as possible.

There are several possible grinding methods. Crushed or pulverized limestone may be ground dry in, for example, a ball mill. Grinding may be facilitated through the addition of 30% water. Trace amounts of surface-active substances, known as detergents, are also known to give a more homogeneous slurry and to decrease the tendencies toward sedimentation.

Other positive effects of the addition of detergents in wet-grinding are that the additives decrease the friction between the particles, which decreases friction losses when grinding, and increases the thermodynamic stability of the slurry. Wet storage normally decreases the specific surface, so the product must be used as quickly as possible. Thermodynamic analysis provides the following explanation of this phenomenon.

Small particles with large specific surfaces are uneven, with a large number of fresh exposure surfaces with extremely small radii of curvature. Sections with small radii of curvature and fresh exposure surfaces have greatly increased surface energy as a result of the surface tension between the solid phase and the liquid. When the radius of curvature is sufficiently small, this surface energy has the same order of magnitude as the chemical potential of the ions which have separated from the solid material. This is notable in the form of increased solubility of the solid material on the small radii of curvature. Solid material then dissolves and creates ions which are then crystallized on flat surfaces to achieve macroscopic equilibrium. Thus, the fine structure is continually effaced, and the specific surface decreases.

However, this phenomenon can be slowed down considerably through the addition of trace amounts of detergent. The additive is then adsorbed onto the surface of the solid material, which decreases the surface energy and increases the thermodynamic stability.

There are also other conceivable ways of attaining a limestone slurry with a high specific surface. In some natural deposits sections of limestone particles suspensions may be found. The particles are stable as the result of the adherence of natural stabilizers such as humus. The slurry can be removed directly from its source and pumped into a truck, for use in the spray drying absorption process of this invention, probably after further grinding.

At certain chemical plants and other process plants limestone is a by-product. Such limestone sometimes has a relatively large surface and is thus suited to the spray drying absorption process of the present invention. For example, in the paper industry, lime is used in the process. Crystallized limestone is then obtained as a by-product which, after suspension and probably further grinding, may be used in the spray drying absorption process of the present invention.

FIG. 1 shows a theoretical flow chart of a conventional spray drying absorption process.

Hot flue gases containing $SO_2$ are led into an $SO_2$ reactor, 1 where a slurry or a reagent solution is sprayed in through nozzles (at 7) (generally a lime slurry is used, but a sodium bicarbonate solution used occasionally). The water then evaporates, and the $SO_2$ is simultaneously absorbed by the drops, and reacts with the added reagent. The evaporation of the water causes the smoke to be adiabatically cooled, but the amount of water sprayed in is adjusted so that the gas is not saturated by the water vapor.

After the water has evaporated, the dry powder, containing the sulphite/sulphate reaction product, unreacted reagent and fly ash, is transported to a dust solids precipitator 2. This equipment is usually composed of a bag house filter system, but can also be an electrostatic precipitator. The $SO_2$ and the reagent also react to some extent in the solids precipitator. The flue gases are then led to a chimney.

The solids which are separated in the separator are transported through a dust return conduit 3 to a moisturizer 5 or to a deposit silo 4. A portion of the solids also falls to the bottom of the $SO_4$ reactor and is also transported to the moisturizer. In the moisturizer, water is added and the slurry thus obtained is led into a mixing tank 6 where fresh calcium hydroxide and more water are added. The slurry thus obtained is pumped up to the nozzles of the $SO_2$ reactor and the procedure is repeated.

We now refer to FIG. 2, which is a theoretical sketch of a limestone-based spray drying absorption process in accordance with the present invention.

As in the conventional spray drying absorption process, hot flue gases containing $SO_2$ are led into an $SO_2$ reactor where a slurry or a reagent solution is sprayed in through nozzles (at 7). The water evaporates, $SO_2$ is absorbed by the drops, and reacts with the added reagent.

The first modification is that the dust moisturizer 5, which takes care of the solids recirculated from the solids precipitator 2 and the $SO_2$ reactor 1, is replaced by grinding equipment 8. In the Figures the return dust from the dust separation precipitator 2 is removed through a return conduit 3 from which it is transported to the grinding equipment 8 or a deposit silo 4. The grinding equipment can also effectively mix a powder with water to obtain a homogeneous slurry. Thus the grinding equipment replaces the moisturizer in this respect. In addition:

the limestone with a small specific surface due to recrystallization or which passed through the grinding process in preparation of the fresh limestone slurry, is ground to obtain a larger specific surface. This increases the reactivity of the returned dust.

the reaction products in the form of calcium sulphite and calcium sulphate which have been bound to the limestone surface or enclosed in the limestone are removed. This both increases the reactivity of the limestone and liberates sulphite in the form of smaller particles. This latter effect is made use of in the subsequent oxidation phase, which will be described in greater detail below.

The other modification is that part of the process equipment, in which partially-used limestone is suspended in water, is made use of as oxidation reactor 9. In this reactor part or all of the sulphite is converted to sulphate through the addition of an oxygen-bearing medium. The course of oxidation is enhanced by the reduction in pH which is obtained through the presence of $CO_2$.

Acidification with $CO_2$ takes place as follows:

$$H_2O + CaCO_3 + CO_2 \rightleftharpoons Ca^{2+} + 2HCO_3^-$$

Thus, in the presence of $CO_2$, the number of dissolved reactive species for reaction with $SO_2$ (i.e. $HCO_3^-$) increases. Thus the reaction slurry which is led from the oxidation tank up to the nozzles has higher reactivity. Therefore the reaction:

$$HCO_3^- + SO_2 \rightleftharpoons HSO_3^- + CO_2$$

can take place to a greater extent without prior dissolving of $CaCO_3$ in the reactor; dissolving is one of the steps which determines the speed.

The oxygen-bearing medium may be air, oxygen, or a current or small stream 10 of the flue gases. The means of decreasing the pH may be carbon dioxide or the carbon dioxide content and/or $SO_2$ content in the flue gases.

The method and the plant can, for example, be set up as indicated in FIG. 2. A portion, in the order of a few percent, of the flue gases is removed prior to $SO_2$ reactor 1 and conducted down into oxidation tank 9. The gas is distributed across the bottom via a spray or sparging nozzle (not shown). Thus the carbon dioxide remaining in the smoke after combustion enhances the oxidation of the sulphite to sulphate. The gases are led into the flue gases stream via a ventilation air channel 11.

The use of limestone thus makes it possible to oxidize the sulphite to gypsum, a product which is easier to handle, disposal and recover. The procedure is not applicable to a lime (i.e. $Ca(OH)_2$) based spray drying process, since unreacted lime, which is always present, raised the pH to such an extent that oxidation ceases.

The combination of grinding equipment and an oxidation tank, placed in above mentioned order, facilitates oxidation. Solutions of crystalline calcium sulphate have an extremely limiting effect on the oxidation rate.

Grinding of the returned dust counteracts this negative characteristic, since crystals of calcium sulphite are liberated.

EXAMPLES CARRIED OUT AS LABORATORY TESTS

Simulated flue gases were bubbled with 10% $CO_2$ and 5% $O_2$ through a slurry of limestone and calcium sulphite. The pH then decreased, due to the presence of $CO_2$. This decrease in pH also made it possible for the sulphite to oxidate to sulphate, using the oxygen in the flue gases as the means of oxidation. A decrease in pH is known to be necessary in order for oxidation to take place.

In similar tests with lime-based slurry, no satisfactory results were obtained because the pH level remained too high.

The present invention can be modified in numerous ways, and is only limited by the enclosed patent claims.

We claim:

1. In a method for spray-drying absorption purification of flue gases containing sulphur dioxide and oxygen by separating from the flue gases sulphur dioxide by treating with calcium compounds, removing dry solids containing substantially calcium sulphate resulting from the oxidation of calcium sulphite by oxygen, and recirculating the solids to a reactor, the improvement comprising:

introducing finely wet-ground limestone having a specific surface of at least 12 $m^2/g$ in the form of a water suspension into the reactor;

mixing an oxygen-bearing medium and an acidifying agent with the recirculated solids and the limestone to produce a reaction suspension;

contacting the flue gases with said reaction suspension to vaporize the water in the suspension, form calcium sulphite, and oxidize the calcium sulphite to produce said dry solids containing substantially calcium sulphate; and said oxidation being promoted by said acidifying agent.

2. A method as claimed in claim 1, further comprising wet-grinding the solids separated from the flue gases before recirculating the solids to the reactor.

3. A method as claimed in claim 1, wherein the acidifying agent is carbon dioxide.

4. A method as claimed in claim 3, wherein the carbon dioxide for the mixing step is provided by directing a portion of the flue gases containing sulphur dioxide to the mixing step.

5. A method as claimed in claim 4, wherein the portion is approximately 2%.

* * * * *